(12) United States Patent
Pelletier et al.

(10) Patent No.: US 8,999,507 B2
(45) Date of Patent: Apr. 7, 2015

(54) METHOD FOR APPLYING AND CURING BY UV RADIATION A SEALANT SYSTEM ONTO NATURAL STONE TILES TO PROVIDE PERMANENT SEALING, PROTECTION, ABRASION RESISTANCE, STAIN AND MOLD RESISTANCE, AND NATURAL STONE TILES PRODUCED BY THE METHOD

(71) Applicant: Questech Corporation, Rutland, VT (US)

(72) Inventors: David Pelletier, Leicester, VT (US); Roger Questel, Arlington, VT (US); Larry Wasowski, Charlotte, NC (US); Dorian C. Guptill, Cornwall, VT (US)

(73) Assignee: Questech Corporation, Rutland, VT (US)

( * ) Notice: Subject to any disclaimer, the term of this patent is extended or adjusted under 35 U.S.C. 154(b) by 0 days.

(21) Appl. No.: 13/693,619

(22) Filed: Dec. 4, 2012

(65) Prior Publication Data

US 2013/0095332 A1    Apr. 18, 2013

Related U.S. Application Data

(62) Division of application No. 12/362,455, filed on Jan. 29, 2009, now Pat. No. 8,323,749.

(51) Int. Cl.
| | |
|---|---|
| *B05D 7/00* | (2006.01) |
| *C04B 41/52* | (2006.01) |
| *C04B 41/00* | (2006.01) |
| *E04F 13/14* | (2006.01) |
| *E04F 15/08* | (2006.01) |

(52) U.S. Cl.
CPC . *B05D 7/00* (2013.01); *C04B 41/52* (2013.01); *C04B 41/009* (2013.01); *E04F 13/144* (2013.01); *E04F 15/08* (2013.01)

(58) Field of Classification Search
USPC ................................................ 428/411.1, 523
See application file for complete search history.

(56) References Cited

U.S. PATENT DOCUMENTS

| | | |
|---|---|---|
| 3,949,107 A | 4/1976 | Schoenholz et al. |
| 4,269,869 A | 5/1981 | Morohashi et al. |

(Continued)

FOREIGN PATENT DOCUMENTS

DE          4421557 C1    8/1995

*Primary Examiner* — Elena T Lightfoot
(74) *Attorney, Agent, or Firm* — Pierce Atwood LLP; Kevin M. Farrell; David J. Wilson (57) ABSTRACT

The invention relates to a process for applying a liquid UV-curable primer sealant to natural stone tiles and related articles followed immediately by the exposure to a requisite amount of low intensity UVA-type UV radiation to partially cure the primer sealant. The partial curing, or pre-setting, of the primer sealant enables control of the ultimate depth of penetration of the primer sealer into the natural stone tiles and natural stone articles of which many examples are quite porous. Because the low level UV irradiation is instantaneous after the primer sealant application the level of primer sealant penetration into the natural stone surface is regulated. The pre-curing of the primer sealant is conducted to intentionally solidify or immobilize the sealant that has actually penetrated into the natural stone surface. The uppermost layers of the primer sealant are left in a semi-liquid or uncured state to allow for wetting and intermingling by the top sealant once it is applied. Thus, the prior art problem of uncontrolled wicking is solved by the present invention.

3 Claims, 3 Drawing Sheets

(56) References Cited

U.S. PATENT DOCUMENTS

| | | |
|---|---|---|
| 4,542,088 A | 9/1985 | Kojima et al. |
| 5,871,822 A | 2/1999 | Lepsche et al. |
| 5,913,617 A | 6/1999 | Helstern |
| 6,068,202 A | 5/2000 | Hynes et al. |
| 6,102,298 A | 8/2000 | Bush et al. |
| 6,423,381 B1 | 7/2002 | Colton et al. |
| 6,436,159 B1 | 8/2002 | Safta et al. |
| 6,527,897 B1 | 3/2003 | Ecker et al. |
| 2002/0098362 A1 | 7/2002 | Mushovic |
| 2003/0068447 A1 | 4/2003 | Carling |
| 2003/0087981 A1 | 5/2003 | Hamrock et al. |
| 2004/0076771 A1 | 4/2004 | Marocco |
| 2004/0146653 A1 | 7/2004 | Diego et al. |
| 2004/0241416 A1 | 12/2004 | Tian et al. |
| 2005/0209358 A1 | 9/2005 | Miller |
| 2006/0057407 A1 | 3/2006 | Sambasivan et al. |
| 2006/0110542 A1 | 5/2006 | Dietz et al. |
| 2006/0263611 A1 | 11/2006 | Weberg et al. |
| 2008/0156438 A1 | 7/2008 | Stumphauzer et al. |

METHOD FOR APPLYING AND CURING BY UV RADIATION A SEALANT SYSTEM ONTO NATURAL STONE TILES TO PROVIDE PERMANENT SEALING, PROTECTION, ABRASION RESISTANCE, STAIN AND MOLD RESISTANCE, AND NATURAL STONE TILES PRODUCED BY THE METHOD

BACKGROUND OF THE INVENTION

The appearance and integrity of natural stone tiles and articles may become easily deteriorated by contact with water, dirt and grit, and chemical and cleaning substances. Natural stone is often quite porous and should be sealed to prohibit the penetration of water, dirt, and chemical substances. Additionally, natural stone may be subject to efflorescence wherein water soluble salts may form deposits on the surface over time.

Commercial sealers exist for the purpose of controlling the appearance and integrity of natural stone surfaces however these products are often only effective over a short term and must be re-applied periodically. These products may not fully protect the natural stone surface for even relatively short exposures to water, household cleaners and other reagents where permanent dulling or deterioration of the natural stone surface may occur. Further, commercial sealers may not offer abrasion or scratch resistance to the natural stone surface as well from abrasive materials such as may be expected from normal floor traffic or from abrasive cleaning products.

Commercial sealers may enhance the color properties and other aspects of natural stone tiles and articles however these aspects can fade over time as the effectiveness of the sealers diminish. Commercial sealers are generally used only after the natural stone tiles or natural stone articles are installed for use.

Further problems that persist with the currently available commercial sealers include: one, the inability of properly controlling wicking of the sealer into the stone and, two, control of the final appearance of the sealer once the sealer has been cured. The visual appearance of the sealer is directly related to the control of wicking mentioned above and other considerations. A third problem is the control of exudates on various types of natural stone. Excessive exudates negatively affect the adhesion of the sealants to the stone and the final appearance of the stone. These problems have been unsuccessfully dealt with in the prior art.

Therefore, what is needed are sealants and methods of use for natural stone tiles and articles that give a permanent solution to the problems stated above.

SUMMARY OF INVENTION

The invention relates to a process for applying a liquid UV-curable primer sealant (also referred to herein as the "primer" and "primer sealer") to natural stone tiles and related articles followed immediately by the exposure to a requisite amount of low intensity UVA-type UV radiation to partially cure the primer sealant. The partial curing, or pre-setting, of the primer sealant enables control of the ultimate depth of penetration of the primer sealer into the natural stone tiles and natural stone articles of which many examples are quite porous. Because the low level UV irradiation is instantaneous after the primer sealant application the level of primer sealant penetration into the natural stone surface is regulated. The pre-curing of the primer sealant is conducted to intentionally solidify or immobilize the sealant that has actually penetrated into the natural stone surface. The uppermost layers of the primer sealant are left in a semi-liquid, partially cured state (e.g., tacky or sticky) to allow for wetting and intermingling by the top sealant once it is applied. Thus, the prior art problem of uncontrolled wicking is solved by the present invention.

Regarding the "viscosity" of a "partially" cured primer, the "viscosity" is actually not a single number but rather a smooth curve of values where viscosity (in centipoise: cP) changes with the shear rate at which the liquid sealer is stressed or sheared (as by a rheometer). The "partially" cured primer likely has no meaningful viscosity that a rheometer could measure accurately; in fact, the viscosity might be infinite as in a fluid that has undergone gelation. A gelled fluid may undergo semi-elastic deformations and that may be the case with our primer sealer after exposure to UV radiation.

Figure 3:
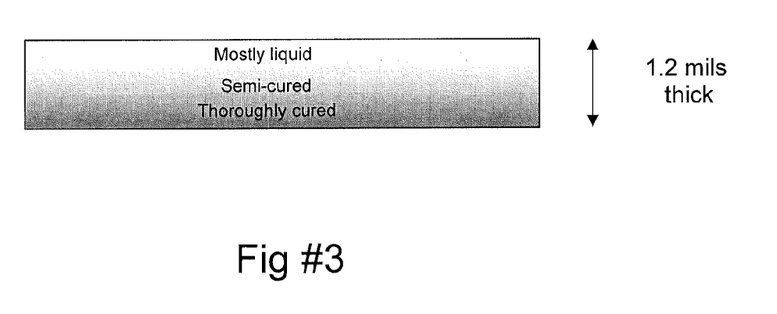
FIG. 3 shows a schematic representation of partially cured prior sealant. The stone tile (not shown) is below the represented sealant.

Rather, we have a nearly fully cured or gelled primer sealer after UV exposure at all depths (cross-sectional) of the applied sealer with the exception of the topmost layers. There is a gradation of viscosities from the first few microns (25 microns per mil), where a solidified or gelled film or layer observed, to a more fluid surface. See, FIG. 3. Herein, this variance in viscosities from solid or near solid to liquid or near liquid is defined as a "partially cured" sealant layer. The partially cured sealant layer will have adhesive properties. In other words, it will be "sticky" or "tacky." The procedure of partially curing the primer sealer sets (cures) and gels the majority of the primer sealer to control penetration of the often porous stone tile surfaces while leaving the top layer fluid enough to mix with the liquid top sealer when applied. After the top sealer is applied the upper liquid "uncured" layer of the primer sealer intermingles with the liquid top sealer and then undergoes curing with the final UV exposure.

The control of depth of sealer penetration in this manner permits uniform gloss control and other aesthetic features of the natural stone tile or article once the top sealer (also referred to herein as the "top coat" and "top sealant") is applied and cured. Full cure of the primer sealer occurs after application of the top sealer and the subsequent passage under UV radiation. The partial curing of the primer sealer also ensures that the top coat sealer will have suitable adhesion to the primer layer since the two sealants can "mix" at the interface.

The control of the wicking process by partially curing the primer sealer also controls exudates. Quite often if the top sealer penetrates too deeply into areas of the stone (even already having the primer sealer) an "exudate" would form. This "exudate" is the appearance of some of the solid fillers, pigments or other materials that are mixed into the top sealer (for reasons of, for example, controlling the level of gloss). The substances "exude" because the liquid portion of the top sealer is literally being wicked or sucked into the stone. The solid filler particles (or other substances) can not move into the pores because they are either too big or flow too slowly. So, they are left behind to make an ugly deposit (like talcum powder) on top of the tile. This deposit is unwanted but prior art solutions to this problem have not been completely successful. Now this problem has been essentially eliminated by the present invention.

Other benefits of the present invention include regulating gloss by regulating the tile temperature (surface temperature right before applying the primer sealer). The Applicants believe that this connection was unknown at the time of the present invention. The Applicants have learned and disclose herein that there is a correlation between gloss (a "shininess" property we need to control for commercial success) and the tile temperature. In this regard, the Applicants disclose herein methods for controlling gloss that art unknown in the prior art.

Although the present invention is not limited by theory, the Applicants speculate on the cause of this relationship between temperature and glossiness of the cured sealants. It is believe that warmer tiles may allow the primer sealer to cure faster once it is exposed to the UV Given this, the top sealer ultimate gloss is optimized once it is cured. If the tiles are cooler, say at 77° F. versus the desired range of 104° to 122° F., then a poorer cure might be achieved for the primer sealer thereby leading to slightly more intermingling of the top sealer with the primer sealer. Since there is a lot more filler (silicas) in the top sealer, the filler materials could become more diluted in the short time span that the top sealer sits on the primer sealer before curing. The primer sealer alone, if cured completely, is quite glossy.

The detailed description of the methods for applying a permanent protective sealant to natural stone surfaces is disclosed below. In addition to the methods discussed above, the invention relates to liquid UV-curable solventless sealant compositions and, where required or desired, aqueous (i.e., solventless) UV-curable primer sealant compositions. Herein, the term "solventless" means free or essentially free of volatile organic compounds.

Additionally, the invention relates to equipment suitable for applying a liquid UV-curable solventless sealant to natural stone and also to the equipment suitable for applying, where required, an aqueous primer sealant just prior to the aforementioned liquid UV-curable solventless sealant, as well as to methods of use of said suitable equipment. In this regard, the invention relates to an economical process for applying a permanent sealer to natural stone tiles and related articles such as natural stone borders, trims, medallions, etc., intended for installation as wall coverings, floorings, countertops and the like. Further, the invention relates to the treatment of the unsealed stone tile surface by the use of radiant energy to dry the surface as well as to allow for improved wetting once the sealant is applied. The sealant is radiation curable immediately after application to the stone surface thereby enabling fast conversion times and brevity of the entire process.

The UV-curable sealant is designed without volatile solvents (i.e., solventless, aqueous or aqueous-based sealants) to enable an environmentally compliant process and minimize application equipment design features. The UV-curable sealant composition is also designed to provide for a durable, abrasion resistant and chemical stain resistant finish on the natural stone tile or natural stone article surface. The UV-curable sealant may also, optionally, contain a biocidal agent for prohibiting mold, mildew and other fungal growth on the tile surfaces over the lifetime of the tile installation.

The UV-curable primer sealant (used where required as disclosed herein or beneficial to tile appearance) is formulated from suitable water-based acrylate-functional dispersions in water wherein the glass transition of the disperse phase is low enough to allow for proper filming once applied to a tile surface conditioned at about 35 to 45° C. Further, the UV-curable primer sealant is formulated with a requisite amount of photoinitiator to allow for complete through-cure once exposed to UV irradiation. Even further, the UV-curable primer sealant can be formulated with additional components such as water miscible UV-curable agents or monomers. These monomeric materials are generally non-volatile and their levels of incorporation into the water-based primer sealant are chosen to provide intermediate effects on the level of darkening or enhancement or enrichment of the tile color, grain and/or marbling of the subject stone. Using a water-based UV-curable primer sealant in the absence of these agents will generally provide the least effect in tile color, grain and/or marbling enhancement or enrichment.

Figure 1:
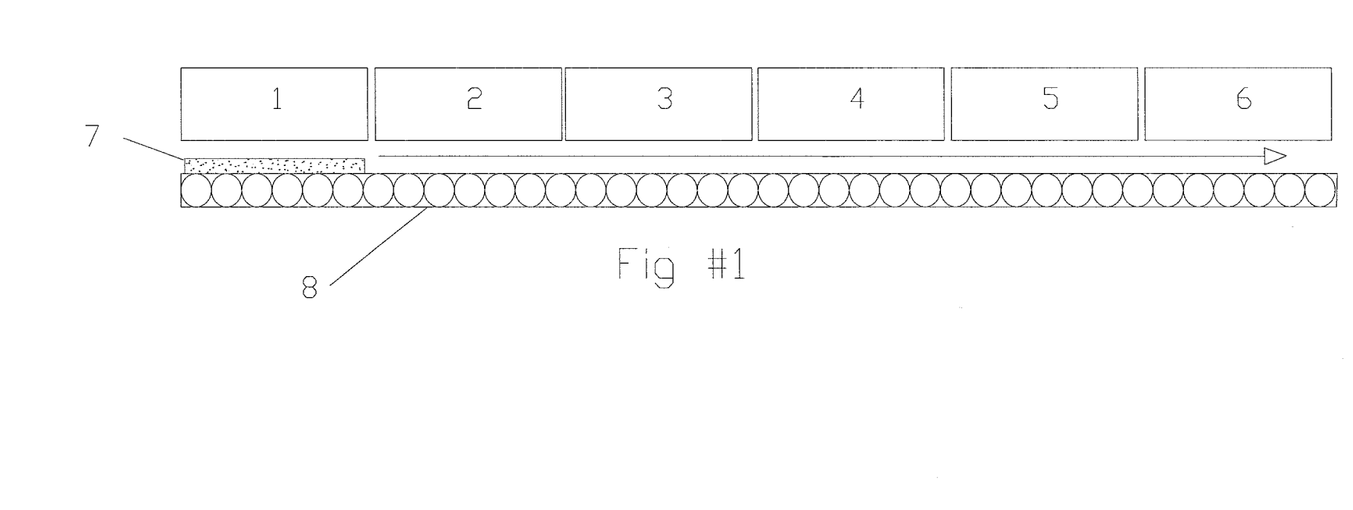
FIG. 1 shows a schematic diagram of a conveyer system suitable for applying the primer and finish sealant compositions of the present invention to natural stone tiles.

Equipment useful for these sealing methods and compositions takes into consideration the need for compactness, minimization of energy input and volatile emissions, and maximum transfer efficiency of the sealant (or sealants) during application. Further, the equipment may be self-contained and automated. A schematic diagram of a suitable piece of equipment is shown in FIG. 1.

Viscosity Adjustment & Component Choices for the Primer Sealant

The chemicals that make up the sealants we describe above and below are generally well known to the industry and commercially available although some of the inventive discoveries made by the Applicants are not obvious to those of skill in the art. For example, providing benefits to the sealing of natural stone by eliminating of low viscosity components in the primer sealer goes against prior art convention. The Applicants found that many stone tiles act like sponges regardless of how the coatings are applied and that low viscosity materials completely wick into the tile leaving a porous surface and very little coating, if any, on the surface. This effect led the Applicants to develop formulations that were more viscous and less prone to deep penetration of the tile. However, some penetration of the stone was needed to get the sealing action ultimately required. It was discovered that the combination of novel and non-obvious primer sealant formulations along with quick curing by UV (fluorescent bulbs) would control the prior art penetration problem. The primer sealant has a range of viscosity to permit application (e.g., by spraying) and to control wicking. Control of curing allowed for a suitable primer surface for the proper adhesion of the top coat. These new sealant formulas and processes of applying the primer sealant allow for the application of the top coat (sealant) on any stone surface without the wicking in, surface variation and suitable adhesion of the top coat. Thus, these prior art problems have been solved with these unpredicted breakthroughs in sealant formulation and sealant application.

Sealant Compositions

The UV-curable sealants are designed without volatile solvents (i.e., solventless) to enable an environmentally compliant process and minimize application equipment design features. The UV-curable sealant compositions are also designed to provide for a durable, abrasion resistant, chemical stain resistant finish on the natural stone tile or natural stone article surface while also imparting an enhanced and enriched appearance. The UV-curable sealing system also contains, optionally, an anti-microbial agent for prohibiting mold, mildew and other fungal growth on the tile surfaces over the lifetime of the tile installation.

The UV-curable primer sealant is composed of acrylate-functional oligomers and monomers chosen from a select group of materials having neat viscosities at 25° C. of about 100 to about 1000 centipoise (cP), and even more specifically of about 200 to about 800 cP. The use of common UV-curable acrylate-functional diluents such as hexanediol diacrylate and tripropyleneglycol diacrylate (both less than 10 cP viscosity) is problematic since these materials when applied as part of a primer sealant will selectively penetrate natural stone tiles and articles to an appreciable depth causing surface appearance irregularities. The use of intermediate viscosity components in the primer sealant, accompanied by the instantaneous low level UV-partial curing of the primer sealant mitigates the rapid penetration of the sealant into natural stone tiles that are often quite porous, but preventing a total cure.

Examples of intermediate viscosity UV-curable acrylate-functional components for use in the primer sealant of this application include pentaerythritol tetraacrylate, di-trimethylolpropane tetraacrylate, propoxylated pentaerythritol tetraacrylate, and pentaerythritol triacrylate. Additionally, for controlling crosslink density upon UV curing of the sealant select acrylate mono-functional monomers containing pendant hydroxyl groups and significant carbon chains such as the acrylic acid adduct of the glycidyl ester of versatic acid (ACE™ hydroxyl acrylate monomer from Hexion Specialty Chemicals, Inc.).

Further, the primer sealant contains an amount of UV-curable acid-functional reagent as an adhesion promoter given the basic (alkaline) nature of most natural stone surfaces.

Further, the UV-curable primer sealant is formulated with a requisite amount of photoinitiator to allow for initial partial curing when exposed to low level irradiation just after application to the natural stone surface and still sufficient to render complete through-cure once exposed to additional UV irradiation after the top sealant has been applied.

Even further, the UV-curable primer sealant can be formulated with additional components such as other inert materials to provide for improvements in abrasion resistance of the fully UV-cured sealing system. Such materials include, but are not limited to silicas, alumina, etc. These same materials may also act as fillers for filling in open pores often found with natural stone tiles and articles. Additionally, other agents may also be used for specific performance effects such as silane coupling agents. Examples of silane coupling agents that are useful are: Z-6030 from Dow Corning (Midland, Mich.) and Silquest® A-174 from Momentive Performance Materials (Albany, N.Y.).

The top sealer composition also contains requisite amounts of fillers such as silicas to affect surface gloss once properly cured by UV-radiation of the sealant system, Specular gloss of the sealed natural stone tiles and articles is a controlled attribute and feature. The use of inert materials to control specular gloss is a well known practice. However, for porous substrates such as many natural stone tiles and articles, the possibility for "exudation" formation during the sealing process is problematic. In these situations the migration of low viscosity liquid components of the sealer into the pores of porous natural stone surfaces can concentrate the solid inert particles in the upper layers of the sealer. These deposits can appear to be powdery "exudates" which are undesirable. These deposits can form rapidly such that they become visible just after spray application but before UV curing of the sealer.

Thus, a further feature of this invention is the partial pre-curing or pre-setting of the primer sealant which fills the pores of porous natural stone surfaces to eliminate the possibility of "exudate" formation once the top sealer is applied prior to UV curing of same.

Figure 2:
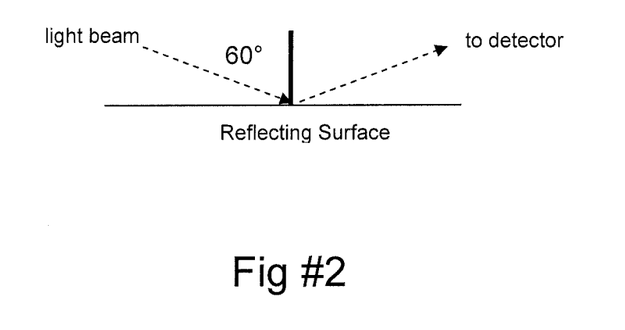
FIG. 2 shows a schematic diagram representing the measurement of "gloss."

Additionally, regarding specular gloss control of the sealed natural stone tiles and articles, the temperature control via infra-red (IR) exposure of the unsealed natural stone tiles and articles is correlated such that surface temperatures of 104° F. to 122° F. prior to sealing generate specular (60° incident) gloss readings for properly formulated top sealer compositions of 5 to 10 gloss units, whereas surface tile temperatures at typical room temperature environments of 77° F. (i.e., without IR exposure) generate gloss readings for the same sealant compositions of 10 to 20 gloss units. 60 degree incident (paragraph [0026]) is the instrument setting at which an angled light beam is bounced off a horizontally mounted surface. The amount of reflected light is measured by a detector at the opposite angle. Thus a gloss reading is usually simply reported as a value at 60° (or also if chosen, at 80° or 20°). See, the FIG. 2. Gloss readings should always reference the incident angle.

The equipment chosen for this coating method takes into high consideration the need for compactness, minimization of energy input and volatile emissions, and maximum transfer efficiency of the sealant (or sealants) during application. Further, the equipment is self-contained and automated.

DESCRIPTION OF INVENTION

The detailed description of the method for applying a permanent protective sealant to natural stone surfaces is disclosed below. The method relates to the procedures and methods used to apply a UV-curable primer sealant to natural stone and also to the equipment to apply a UV cure a top sealant subsequent to the UV-curing of the aforementioned UV-curable primer sealant and to the composition of the UV-curable sealants and to the properties of the natural stone sealed in this manner.

The method described below may have many embodiments as envisioned depending in part on the sealant application technique whether by spray, roller, curtain, mist, etc. Therefore the method should not be considered as limited based on the brief description given below. Further, the details of the sealant compositions below should not be considered as limited to those few examples given. Based on the teachings of this specification one of skill in the art will be able to devise other formulations suitable for use in the present invention.

Normal preparation of the unsealed natural stone tiles or natural stone articles proceeds with cleaning of all milling dust from the surface through well understood means such as brushing, wiping, vacuuming or by air flow (i.e., blowing). Such techniques however do not necessarily in themselves remove excess water that may reside on or near the surface of unsealed natural stone tiles or articles. In accordance with this invention radiation heating in the form of infrared (IR) heating is applied to the natural stone surfaces for a brief period to heat the surface to 40° to 60° C. just prior to the sealant application. More preferably the tile surface should be taken to 45° to 50° C. just before sealing. This action is possible by passing the tiles on a belt or conveyance under properly situated IR lamps. As a further part of this invention the IR light intensity should be as high as possible to minimize the natural stone tile exposure time.

In accordance with this invention the UV-curable solventless sealant composition is comprised of a mixture of polymers, oligomers and reactive diluents having polymerizable functional groups as part of their chemical structure.

For the top sealer composition polymers and oligomers common to the art include, but are not limited to, acrylate and methacrylate type materials including urethane-acrylates, epoxy-acrylates, polyester-acrylates, acrylic-acrylates, melamine-acrylates, and the like.

Reactive diluents, also called monomers, suitable for use in the solventless UV-curable top sealant composition include, but are not limited to, the following materials: hexanediol diacrylate, butanediol diacrylate, trimethylolpropane triacrylate, pentaerythritol tetraacrylate, tripropyleneglycol diacrylate, dipropyleneglycol diacrylate, isobornyl acrylate, N-vinyl pyrrolidinone and N-vinyl caprolactam. Such monomers may be used in sufficient quantity to reduce the viscosities of the polymers and oligomers such that ease of application is acquired. This is especially required when inert components such as high surface area silicas are used for ultimate gloss reduction. The weight percent of reactive diluents (monomers) will generally exceed 60% for effective viscosity dilution.

The UV-curable solventless sealant omits the use of conventional organic solvents as the means to lower and regulate application viscosities. Instead, judicious amounts of reactive diluents as detailed above are utilized.

In addition, the UV-curable top sealant of this invention contains a requisite amount of one or more photoinitiators to enable a response to the exposure of actinic radiation (actinic radiation is defined by those of skill in the art as: electromagnetic radiation that can produce photochemical reactions or, similarly, electromagnetic radiation that is capable of initiating a chemical reaction). These photoinitiators are comprised of select materials that generate free radical species through either direct α-cleavage, or through hydrogen abstraction mechanisms. Typical photoinitiators include, but are not limited to 1-hydroxy-cyclohexyphenyl ketone, 2-hydroxy-2-methyl-1-phenyl-1-propanone, phosphine oxide, phenyl bis(2,4,6-trimethylbenzoyl), benzophenone, and the like. Additionally synergists may be used such as methyldiethanolamine.

As a feature of this invention, the actinic radiation may be provided by light-emitting diodes or other similar solid state devices at wavelengths in the region of 395±20 nm. Consequently, the choices of proper photoinitiators are limited to those which absorb radiation at those same stated wavelengths. Such photoinitiators include but are not limited to the phosphine oxide types mentioned above. Alternatively, the actinic radiation may be provided by select intermediate wattage UVA-emitting fluorescent light bulbs. In such cases the use of photoinitiator packages including photoinitiators that respond to wavelengths lower than 395 nm can be used. UVA-emitting fluorescent light bulbs will generally emit strongly at 365 nm.

Various other agents comprise the solventless UV-curable sealant including inorganic materials such as silicas and aluminas for gloss control and abrasion resistance. Examples of silicas include amorphous materials such at ACEMATT® TS-100, ACEMATT® 3300 and AEROSIL® R972 (DeGussa, a division of Evonik Industries, Essen, Germany). Examples of alumina include Tabular T60/T64 and A3000FL (Almatis, Frankfurt, Germany and Bauxite, Ark.).

Additionally, additives may be formulated into in the UV-curable top sealant to provide for surface flow and leveling during and after application of the sealant. Further, special additives such as NANOBYK® 3601 (BYK-Chemie, Wesel, Germany) may be used to add nanoparticles of alumina for improved abrasion of the cured sealant and stone tile. Further, anti-microbial agents known in the art may be formulated into the UV-curable top sealer to render the sealed natural stone tile or article to long term protection and resistance to bacterial and fungal fouling.

Also in accordance with this invention the select use of intermediate viscosity acrylate-functional UV-curable oligomers and monomers is critical for controlling the ultimate degree of primer sealant penetration into the natural stone surface once applied and prior to UV-curing. Low viscosity acrylate-functional monomers as mentioned above for use in the top sealer compositions are less useful in this respect for the primer sealer. Optimally, the use of neat (otherwise undiluted) oligomers and monomers having room temperature viscosities of 100 to 1000 cP is better. Such materials include multi-functional acrylate-oligomers as pentaerythritol tetraacrylate, pentaerythritol triacrylate, and di-trimethylolpropane tetraacrylate. An example of a mono-functional acrylate monomer is the acrylic acid adduct of the glycidyl ester of versatic acid (ACE™ hydroxyl acrylate monomer, Hexion Specialty Chemicals, Inc., Columbus, Ohio). Other examples include caprolactone acrylate [SR 495B, Sartomer Company Inc., Exton Pa.], and ethoxylated nonylphenyl acrylate [SR504, Sartomer Company Inc.]. Blends of the aforementioned oligomers and mono-functional monomers to control crosslink density of the UV-cured sealant is also permitted in this invention. The preferred mono-functional monomer is the acrylic acid adduct of the glycidyl ester of versatic acid (ACE™ hydroxyl acrylate monomer; Hexion Specialty Chemicals, Columbus, Ohio). Thus, the weight ratios of the multi-functional oligomers to the mono-functional monomers can range from as high as 5 to 1 to as low as 0.5 to 1 depending on the ultimate hardness or glass transition temperature ($T_g$) of the UV-cured sealant desired.

Also in accordance with this invention is the use of specific amounts of acid-functional UV-curable monomers for incorporation into the primer sealer.

These acid-functional monomers perform as coupling agents between the mildly basic surface of the natural stone tiles or natural stone articles and the UV-curable sealant. The acid-functional monomers also have carbon-carbon double bond functional groups that polymerize into the UV-curable sealant matrix during exposure to UV radiation.

Examples of acid-functional monomers include, but are not limited to, acrylic acid (AA), methacrylic acid (MAA), beta-carboxyethyl acrylate (B-CEA) and 2-hydroxy ethyl methacrylate phosphate. Of these, B-CEA and 2-hydroxy ethyl methacrylate phosphate are preferred because of their relative non-volatility and lower odor. All of these acid-functional monomers have fairly low molecular weight thereby improving their effectiveness as adhesion promoters to natural stone when used at low weight percentages in the UV-curable primer sealant composition.

For improving adhesion of the UV-curable primer sealant to natural stone surfaces the effective levels of these acid-functional monomers is in the range of 1 to 4 by weight of the total primer sealant composition. At less than 1% by weight of total primer sealant composition adhesion may be marginal. At greater than 4% by weight no further improvement is noted. In the range of 1% to 4% by weight in the primer sealant the adhesion of the UV-curable sealing system is 100% as determined by standard methods including ASTM D 3359-Method B.

The solventless UV-curable sealant compositions referred to previously, containing 1 to 4% of an effective acid-functional monomer in the primer sealant component, and containing various levels of acrylate-functional polymers and oligomers, and containing various levels of alumina and/or silica agents, and containing various levels of reactive diluents (monomers) may have liquid viscosities that become excessive for the application method intended. Such application methods may include spraying (air or airless), roller, curtain, mist, etc. As part of this invention, the solventless UV-curable sealants can be heated just prior to the chosen application method to facilitate the transfer of the sealants to the intended natural stone surface. The recommended heating range for the sealants, using well known methods (such as by heat exchangers), is preferably 30° C. to 50° C., and more preferably 35° C. to 40° C.

Preferred methods of sealant application are high transfer efficiency methods such as ultrasonic spray and low volume low pressure spray. For example, U.S. Pat. No. 6,102,298 to Bush, et al., which is incorporated herein by reference for ultrasonic spraying or, alternatively, U.S. Pat. No. 5,871,822 to Lepsche, et al., and U.S. Pat. No. 6,068,822 to Hynes, et al., both of which are incorporated herein by reference, which describe devices and methods for spray application using low volume low pressure technology.

The preferred method of sealant application is by spray application such that the viscosity of the sealant is adjusted by composition and by temperature to less than 200 cP at the instant of application.

Preferred methods of sealant application are high transfer efficiency methods such as ultrasonic spray and low volume low pressure spray. For example, U.S. Pat. No. 6,102,298 to Bush, et al., which is incorporated herein by reference for ultrasonic spraying or, alternatively, U.S. Pat. No. 5,871,822 to Lepsche, et al., and U.S. Pat. No. 6,068,822 to Hynes, et al., both of which are incorporated herein by reference, which describe devices and methods for spray application using low volume low pressure technology.

EXEMPLIFICATION

Example 1

In some of the following examples of this invention natural stone tiles consisting of various sizes such as four inch by four inch by ⅜ inch thick specimens of assorted tumbled marble, tumbled travertine, and tumbled limestone were placed on a moving belt at 10 ft per minute and were subjected to an air knife to remove any loose particles, milling dust and other debris. On this belt the tiles were passed under a bank of infrared lamps set at approximately 600° F. to provide radiant heating such that the tile surface temperature was raised ten to fifteen degrees above ambient to achieve approximately 35° to 40° C. surface temperature as determined by a handheld IR temperature sensor.

After this conditioning step the tiles were sprayed with coatings described further below except where noted otherwise.

In one embodiment of this invention a single UV-curable sealant composition was tested with and without the presence of 5% by weight beta-carboxyethyl acrylate monomer. Thus, Composition A: mixture of acrylate functional oligomer (approx. 15% by weight) with hexanediol diacrylate (approx. 50% by wt.) and isobornyl acrylate (approx. 15% by wt.) and trimethylolpropane triacrylate (approx. 5% by wt.) and dipropyleneglycol diacrylate (approx. 5% by wt.) and alumina (approx. 5% by wt.) and 1-hydroxycyclohexylphenyl ketone (approx. 2.5% by wt.) and 2-hydroxy-2-methyl-1-phenyl-1-propanone (approx. 2.5% by wt.).

Composition B: same as Composition A plus approx. 5% beta-carboxyethyl acrylate (B-CEA) by weight.

Onto each of two twelve inch by twelve inch tumbled marble stone tiles were cast 6.0 mil wet films of Composition A and Composition B (above) using a Bird applicator. The tiles were then exposed to UV radiation under an air atmosphere for a duration of 1 to 1.5 seconds [approximately 2.0 Watts/cm$^2$ UV-A intensity, type D bulb from Fusion UV Systems, Inc., Gaithersburg, Md.]. After this step both sealants were hard and scratch resistant however on taped crosshatch adhesion [ASTM D 3359-Method B] the sealant of Composition A failed (rating OB) whereas the sealant of Composition B passed completely (rating 5B).

In similar fashion to the above, Composition A was modified with about 1.7% by weight B-CEA (Composition C), and also with about 3.4% by weight B-CEA (Composition D). Drawdowns (6.0 mil wet) of these compositions onto tumbled marble followed by the same UV curing schedule passed taped crosshatch adhesion (4B and 5B ratings respectively).

In some of the following examples of this invention natural stone tiles consisting of various sizes such as four inch by four inch by ⅜ inch thick specimens of assorted tumbled marbles, tumbled travertines and tumbled limestones were arrayed on a metal tray and were placed on a moving belt subjected to rotating brush and vacuum system to remove any loose particles, milling dust and other debris. On this belt the tray holding the tiles were positioned under a bank of infrared lamps set at approximately 950° F. to provide radiant heating such that the tile surface temperature was raised ten to fifteen degrees above ambient to achieve approximately 35° C. to 40° C. surface temperature.

After this conditioning step the tray holding the tiles was automatically positioned under two sets of low-volume low-pressure (LVLP) spray heads configured to sequentially spray a requisite and uniform amount of a primer sealer followed by a requisite and uniform amount of a top sealer to the top surfaces of the tiles. Just after application of the primer sealant, but just before the application of the top sealer the tray holding the tiles was passed under two 90 watt UVA-emitting fluorescent light bulbs providing a partial cure of the liquid primer sealant. After spray application of the top sealer the tray holding the tiles was passed into an inert gas chamber (at or below 4° A oxygen gas content) and irradiated under 395 nm emitting LED's for several seconds.

Primer Sealer Composition E:

Acrylate functional oligomer Etermer EM242 [Eternal Chemical Co. Ltd., Taiwan] (approx. 60% by weight) with ACE™ hydroxyl acrylate monomer [Hexion] (approx. 25% by weight), tabular alumina [Almatis] (approx. 5% by weight), hydroxyethyl methacrylate phosphate Etermer EM39 [Eternal chemical Co. Ltd.] (approx. 3.0% by weight), silicas Aerosil R972 and Acematt 3300 [Evonik] (approx. 3% by weight), and Esacure KTO-46 [Lamberti] (approx. 4% by weight). Viscosity was about 400 cP at 35° C.

Top Sealer Composition F:

Acrylate functional oligomer Etermer EM242 [Eternal Chemical Co. Ltd.] (approx. 20% by weight), hexanediol diacrylate EM221 [Eternal Chemical Co. Ltd.] (approx. 40% by weight), tripropylene glycol diacrylate Etermer EM223 [Eternal Chemical Co. Ltd.] (approx. 25% by weight), silicas Aerosil R972 and Acematt 3300 [Evonik] (approx. 10% by weight), and Esacure KTO-46 [Lamberti] (approx. 4% by weight). Viscosity was about 200 cP at 35° C.

After application and UV curing in the above manner the sealed tiles were subjected to multiple testing for appearance, specular gloss, adhesion, chemical and stain resistance, abrasion resistance, hot water shower resistance, coefficient of friction rating and steam resistance.

Improvements of the present invention over conventional liquid sealants and enhancing materials for natural stone are displayed below.

An array of natural stone tiles consisting of tumbled marble, travertine, and limestone specimens were treated (top surface only) with a commercially available liquid product designed for sealing and enhancing such surfaces: Enrich'N'Seal™ (Aqua Mix Inc., Seal Beach, Calif.). After several days drying the tiles were compared visually to the same tile array prepared by the current invention as described above. The present invention showed equivalent levels of color and tonal enhancement of the sealed tiles as with the commercial liquid product. Of more value though, the method and sealant composition of the invention provide for improved protection to various household foods and cleansers for commercial value. Thus, six hour covered spot tests with coffee, red wine, and orange juice exhibited distinct discoloration of a tumbled marble tile treated with Enrich'N'Seal™, but no effects were observed on an identical tumbled marble tile sealed with the sealing system represented by the compositions for the primer sealer and top sealer illustrated above and by the method described in this invention.

Further to this invention the natural stone tiles sealed in this manner have significantly improved abrasion resistance over similar natural stone tiles treated with liquid products such as Enrich'N'Seal™. Thus, the abrasion ratings for similar natural stone tiles per ASTM C1027: "Standard Test Method for Determining Visible Abrasion Resistance of Glazed Ceramic Tile" were:

12000 revolutions [Class 4 rating] for sealed tile in the above manner 600 revolutions [Class 2 rating] for sealed tile with Enrich'N'Seal In another series of tests comparing sealed tiles with the present invention and those sealed with the commercial liquid product Enrich'N'Seal the tiles were exposed to the following test reagents per ASTM C650: "Resistance of Ceramic Tile to Chemical Substances" and for a test duration of 24 hours at 74° F. The term "affected" in Table 1, below, means that the tile coating or tile showed one or more visual detrimental effects from the test substance. A "visual detrimental effect" may be, for example, staining of the coating or leach-through to the stone surface, degradation or marring of the coating, destruction of the surface coating (e.g., the test substance ate into or through the coating and/or to the surface of the tile, a loss of glossiness to the surface, the development of an opaque quality to the coating, etc.

TABLE 1

| Test Solution: | Visual Result [Affected?] | |
| --- | --- | --- |
| | Primer Sealer E/Top Sealer F | Enrich'N'Seal |
| Acetic acid, 10% | No | Yes |
| Citric acid, 10% | No | Yes |
| Lactic acid, 5% | No | Yes |
| Phosphoric acid, 10% | No | Yes |
| Sulfamic acid, 10% | No | Yes |
| Hydrochloric acid, 18% | No | Yes |

A depiction of the equipment to conduct an energy efficient sealing process for natural stone tiles is shown in FIG. 1.

FIG. 1 illustrates a variable speed conveyor 8 of overall length of approximately 15 feet and of approximately 30 inches wide which transports a flat profile tile specimen 7 under six modules in the following order: a surface temperature adjustment module 1 containing an infrared radiation element or elements, a low pressure low volume (LVLP) spray head 2 for applying the UV-curable primer sealant, an array of low intensity UVA-emitting fluorescent light bulbs 3 for pre-curing the applied primer sealant, a second ultrasonic spray head 4 for applying the 100% solids UV-curable top sealant, an inert gas fixture 5 for flooding the tile surface just before exposure of the transported tile under the UV radiation emitting LED array 6 (or optionally an array of low intensity UVA-emitting fluorescent light bulbs).

Example 2

The following experiment shows the dependency of relationship of the cure of the base (primer) sealer in air when exposed to UVA emitting fluorescent bulbs. For the dry film thickness of about 1 mil (0.001 inch), which is in the range desired for the commercial applications of primer sealer, the weight fraction of material cured (starting at the bottommost portions of the applied sealer) is about 60%. That is, after removing the liquid uppermost uncured sealer after UV exposure about 60% of the sealer remains as fully cured material. There are numerous variables that can affect this result though. The topmost 40% remains in a state of partial cure and is suitable for application of the top coat (sealer) as is described elsewhere in this application.

Experimental Details: Drawdowns of primer sealer formulation were made at variable wet film thicknesses onto glass plate using a Bird type applicator, as is known to one of skill in the art. (A drawdown is the action of applying a wet uniform liquid film onto a flat, rigid surface by using a suitably metered knife blade, or the like, to pull or "draw" a puddle of the liquid down over the surface). One glass plate was then passed at 2 feet per minute under two UVA emitting fluorescent bulbs in air. The area of the film was computed in square inches ($in^2$). The film was then wiped several times with acetone wetted paper towel to remove all of the upper wet and partially cured layers of the exposed film leaving intact the underlying "dry" film. The dry film is measured in mils and referred to as "dry film thickness" (DFTs). This "dry" film was then removed by scraping with a razor blade and transferred quantitatively to an aluminum weighing dish. The net weight was determined to the nearest 0.1 milligram on an analytical balance ("Partial cure" column in Table 2).

As a control, a second glass plate was prepared identically as above however the glass plate was exposed to UVA radiation emitting from four bulbs at 2 feet per minute while passing through a nitrogen inerted chamber. The fully dried film ("Full cure" in Table 2) was then weighed after removal with a razor blade. The cast area of the film was also recorded.

TABLE 2

| | | Film Weights & Calculated DFT's [in mils] | |
| --- | --- | --- | --- |
| Wet mils | Film area | Partial cure (2 bulbs) | Full cure (4 bulbs) |
| 1.0 | 27 $in^2$ | 0.0272 [0.05] | 0.2967 [0.59] |
| 2.0 | 27 $in^2$ | 0.3123 [0.62] | 0.5037 [1.00] |

Thus, the result for 2 mils (wet film thickness applied) gave a resulting total dry film thickness (calculated from the weight data) of 1.0 mil, but about 0.62 mils calculated when the film was "partially" cured by the two lamp array in air. The total film thickness of 1.0 mil is in the desirable range. The value of 0.62 mils for the partially cured film is also quite acceptable. This partial cure value is clearly a function of applied film weight. Lightly applied films will have a disproportionate amount of material subjected to air inhibition (large). Conversely, thicker films (providing that there is sufficient incident radiation to penetrate the film to large depths) will have proportionately lower levels of uncured top layer material.

This experiment demonstrates that the combination of UVA fluorescence and exposure to air results in the partial cure of the primer sealer in the present invention wherein the lower layers of the primer sealer, which are the furthest distance from the air, obtain a "full cure" whereas the layers closest to the air obtain a "partial cure" or remain uncured. This leaves a sticky or tacky surface suitable for the application of the top coat of sealant as described herein.

Other variables that will affect the proportion of partially cured films would be residence time under a particular lamp array, the radiation intensity of the UVA bulbs, the horizontal distance of the film from the lamps, the number of lamps, etc. Note: the wet film thickness applied is only an approximation. A one mil reading on the chosen applicator does not ensure a one mil "dry" film.

The invention claimed is:

1. A natural stone or tile article sealed according to a method comprising:
   a) cleaning the natural stone tile or article;
   b) conditioning the natural stone tile or article to a specified surface temperature of about 30° C. to about 40° C. by exposing the natural stone tile or article to a regulated amount of heat from one or more heat sources selected from the group consisting of infrared (IR) heating and convection heating;
   c) conditioning liquid UV-curable solventless primer comprising an acid functional reagent selected from the group consisting of 2% to 4% of beta-carboxyethyl acrylate (β-CEA) and 1% to 6% of 2-hydroxy ethyl methacrylate phosphate, and UV-curable solventless top sealant by heating to a temperature of about 25° C. to about 40° C.;
   d) applying the conditioned UV-curable solventless primer, and exposing the primer to UV radiation sufficient to partially cure the applied primer;
   e) applying the UV-curable solventless top sealant; and,
   f) exposing the primer and sealant to UV radiation sufficient to cure the primer and top sealant.

2. The stone or tile of claim 1, wherein said sealed natural stone or tile article shows improved hot water and steam resistance.

3. The stone or tile of claim 2, wherein the improved hot water and steam resistance of the sealant is determined by ASTM D 3359-Method B.

* * * * *